(12) United States Patent  
Noda et al.

(10) Patent No.: US 6,891,300 B2  
(45) Date of Patent: May 10, 2005

(54) ROTOR OF INDUCTION STARTING SYNCHRONOUS MOTOR

(75) Inventors: Yukihiro Noda, Yokohama (JP); Tomoaki Kiriya, Yokohama (JP)

(73) Assignee: Toyo Denki Seizo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/650,243

(22) Filed: Aug. 28, 2003

(65) Prior Publication Data

US 2004/0046472 A1 Mar. 11, 2004

(30) Foreign Application Priority Data

Aug. 30, 2002 (JP) ........................................ 2002-252466

(51) Int. Cl.$^7$ .............................................. H02K 21/12
(52) U.S. Cl. .................... 310/156.78; 310/216; 310/261
(58) Field of Search ............................. 310/156.78, 114, 310/124–125, 216, 261, 166

(56) References Cited

U.S. PATENT DOCUMENTS 6,274,960 B1 * 8/2001 Sakai et al. ............. 310/156.02

* cited by examiner

Primary Examiner—Thanh Lam  
(74) Attorney, Agent, or Firm—Chapman and Cutler LLP

(57) ABSTRACT

A rotor of an induction starting synchronous motor includes permanent magnets and induction coils having both ends short-circuited in a core. The permanent magnets are arranged side by side in a longitudinal direction of the core to form a plurality of sets of permanent magnets. Two sets of the permanent magnets form respective poles of the induction starting synchronous motor. The two sets of permanent magnets forming each of the poles are located inclined or slightly shifted in a cross-sectional plane of the core by rotating the two sets of permanent magnets about corners of the permanent magnets nearest the induction coils as rotating axes into directions such that magnetic fluxes induced by the two sets of permanent magnets are cancelled each other. With this construction, the induction starting synchronous motor can be smoothly started and operated with improved power factor and efficiency characteristics. A slot for receiving the two sets of permanent magnets is preferably formed at its mid portion with a protrusion and a cavity so as not to permit the permanent magnets to contact each other.

2 Claims, 3 Drawing Sheets

ROTOR OF INDUCTION STARTING SYNCHRONOUS MOTOR

BACKGROUND OF THE INVENTION

The present invention relates to a rotor of an induction starting synchronous motor, and more particularly to the arrangement of permanent magnets provided in a core of the rotor.

In general, self-starting synchronous motors are classified into two types, that is, the wound-rotor type having field windings as secondary windings on the side of a rotor, and the permanent magnet type composed of squirrel-cage induction coils and permanent magnets. The wound-rotor type motor rotates as a wound-rotor induction motor on being started by operating a switch, and when its speed has attained a value close to the synchronous speed, the motor in turn rotates as a synchronous motor by operating the switch again to cause the motor to be synchronized with the aid of direct-current excitation induced by an exciter. The permanent magnet type motor rotates as a squirrel-cage induction motor on being started, and when its speed has attained a value close to the synchronous speed, the motor is synchronized by fluxes induced by the permanent magnets to rotate as a synchronous motor. In this motor, the switch and exciter described above are not necessary either in view of its rotor construction. It has been well-known that the permanent magnet type motor is simpler in construction and more durable in operation than the wound-rotor type.

With an induction starting synchronous motor of the permanent magnet type having a rotor composed of squirrel-cage induction coils and permanent magnets, the rotor's construction includes conclusive factors affecting smooth starting and operating characteristics, such as arrangement and characteristics of magnets and shape and size of the squirrel-cage induction coils. Although such a general tendency to be aimed has been recognized, how to design such members in practice has never been clarified.

For example, in the case of excess magnetic fluxes induced by permanent magnets provided in a rotor core, or in the case of high reluctance resulting from difference in magnetic resistance in the rotor core, it has been known that there is a tendency for starting of a motor to become difficult. In contrast herewith, in the case of insufficient magnetic fluxes induced by permanent magnets, or in the case of lower reluctance, it has also been known that there is a tendency that the pull-in operation from the state of starting and operating as an induction motor to the state operating as a synchronous motor becomes difficult. In view of these facts, it is clearly evident that a suitable arrangement and the choice of particular characteristics of the permanent magnets will greatly affect the operation of the motor for the smooth starting and the stable operation as a synchronous motor at its reliable synchronization. Therefore, suitable arrangement of the permanent magnets and selection of their material are very important.

Taking into consideration the characteristics of the permanent magnet type synchronous motor when being operated as a synchronous motor, some prior art proposals have attempted to provide an air gap in the same manner as in a permanent magnet type motor operated by an inverter in order to solve the problem of leakage fluxes occurring at ends of the permanent magnets. Particularly, in the case of the induction starting type synchronous motor, magnetic fluxes induced by the permanent magnets are often intentionally increased for facilitating an easy pull-in for synchronization, and the magnets are sometimes problematically extended in length for increasing the torque causing the motor to be synchronized. On the other hand, however, the induction coils and the permanent magnets must be arranged in a limited space. As a result, distances between the adjacent magnets forming magnetic poles necessarily become shorter with resulting increased leakage fluxes. In many cases, therefore, clearances or gaps are provided between the magnets.

As a prior art induction synchronous motor, there has been an induction motor including induction coils in the vicinity of the surface of a rotor and permanent magnets in the rotor nearer to its center than the induction coils as disclosed in, for example, Japanese Patent Application Opened Nos. 2000-301066 and 2000-287395.

FIG. 2 illustrates in a cross-section a rotor of a four-pole induction synchronous motor corresponding to the motors disclosed in these Japanese Patent Applications. In FIG. 2, there are provided in a rotor core 1 induction coils 3 and on their inner side permanent magnets a with magnetizing directions (S→N) towards side of the stator and permanent magnets b with magnetizing directions (S→N) towards side of the shaft, these magnets being located in slots 2, respectively. In order to prevent magnetic paths formed in the rotor core, that is, so-called leakage fluxes due to the closely adjacent permanent magnets a and b each other, these permanent magnets may be arranged spaced sufficiently to eliminate the influence of the leakage fluxes, or an air gap 7 may be provided between these permanent magnets. These measures can increase flux linkages with the stator so as to increase torque for synchronized rotation of the motor and to improve power factor and efficiency and further to ensure the number of fluxes required for causing the motor to be synchronized.

Not limited to four-pole motors, dimensions of permanent magnets arranged in a rotor will be structurally limited depending on the sizes and shapes of the rotor and induction coils. It is preferable to arrange the permanent magnets as near to a stator as possible to enhance magnetic coupling, leading to improved motor characteristics. This will be, however, attended by increased centrifugal forces due to the heavy magnets positioned remotely from the rotating center, thereby degrading the strength of the rotor core. Therefore, sufficient considerations must be given to arrangement of permanent magnets.

The length of the permanent magnets is limited by the induction coils 3. If the permanent magnets are located too near the stator, they may contact the induction coils and their length is obliged to be shorter. In order to elongate the permanent magnets, they can be arranged as near to the center of the rotor as possible, but with such an arrangement, the ends of the adjacent permanent magnets will be closer to each other and the permanent magnets are positioned more remotely from the stator so that leakage fluxes will increase which adversely affect the motor performance.

The width and thickness of the permanent magnets are thus limited depending upon outer diameters of the rotor and shaft hole and also the size of the induction coils. As the size of the permanent magnets has thus a limitation in design for achieving the best result, selections of suitable material and suitable dimensions and arrangement of the permanent magnets are important.

On the other hand, by arranging permanent magnets side by side in rotating directions to increase the number of magnets per one pole, the length of the magnets can be equivalently elongated. In this case, however, this consequentially increases the total amount of used magnets, resulting in increased manufacturing cost. Recently, there is an increasing demand for improving efficiency and power factor which are electrical characteristics in view of energy saving, in addition to requirements for smooth starting and operation.

As described above, the influence of the number of fluxes induced by magnets and reluctance on starting and pull-in to synchronization of a motor has been well-recognized as the tendencies, but how to design motors so as to overcome this influence has never been known. Therefore, motors sometimes experience poor starting characteristics and difficulties in starting and pull-in to the synchronization. Even if smooth starting and reliable pull-in to synchronous operation are achieved, there are cases of efficiency and power factor remaining at lower values and amount of used permanent magnets being increased with increased manufacturing cost.

SUMMARY OF THE INVENTION

It is an object of the invention to provide an improved induction starting synchronous motor adapted to operate with a high efficiency without increasing total amount of used permanent magnets by arranging them at the most suitable positions.

In order to accomplish the above object of the invention, in a rotor of an induction starting synchronous motor including permanent magnets and induction coils having both ends short-circuited in a core, according to the invention said permanent magnets are located in said core and one or more said permanent magnets are arranged side by side in a longitudinal direction of said core to form sets of permanent magnets, and two sets of said permanent magnets form respective poles of said induction starting synchronous motor, and wherein said two sets of permanent magnets forming each of said poles are located inclined in a cross-sectional plane of said core by rotatably shifting the two sets of permanent magnets about corners of said permanent magnets nearest said induction coils as rotating axes into directions such that magnetic fluxes induced by said two sets of permanent magnets are cancelled each other.

With the above arrangement, the induction starting synchronous motor according to the invention can be smoothly started and operated with improved efficiency and power factor as electrical characteristics without increasing the amount of permanent magnets in comparison with the total amount of permanent magnets arranged in a rotor of an induction starting synchronous motor of the prior art.

In a preferred embodiment of the invention, the core is formed with slots each receiving therein the two sets of permanent magnets, and each of the slots is formed at its mid portion with a protrusion and a cavity so as not to permit the permanent magnets to contact each other. With this construction, the motor not only achieves the object of the invention above described, but in addition prevents the two sets of permanent magnets received in the slot from being damaged due to contacting with each other.

As can be seen from the above, according to the invention only by conceiving the advantageous arrangement of permanent magnets without increasing the amount of the used permanent magnets, it is possible to accomplish smooth starting and operation of the motor and to improve its power factor and efficiency characteristics. Therefore, the induction starting synchronous motor according to the invention is very useful from practical standpoint.

The invention will be more fully understood by referring to the following detailed specification and claims taken in connection with the appended drawings.

BRIEF DESCRIPTION OF THE DRAWINGS

FIG. 1 illustrates the configuration of a rotor core of an induction starting synchronous motor according to one embodiment of the invention. The illustrated synchronous motor is a four-pole induction starting synchronous motor, which will be explained in detail hereinafter. With this embodiment, the novel arrangement of magnets is accomplished by fundamentally changing the arrangement of the magnets in the induction starting synchronous motor of the prior art as shown in FIG. 2 as a prototype, so that circumferential widths of permanent magnets are divided without changing their lengths in the axial direction of the rotor and their thicknesses in the radial direction of the rotor.

Even with the prior art, a plurality of permanent magnets are arranged in the axial direction of a rotor in order to reduce eddy-current losses occurring at surfaces of the permanent magnets. In the present invention, there are also provided a plurality of permanent magnets in the axial direction of the rotor, while avoiding any increase in amount of permanent magnets being used.

Figure 2:
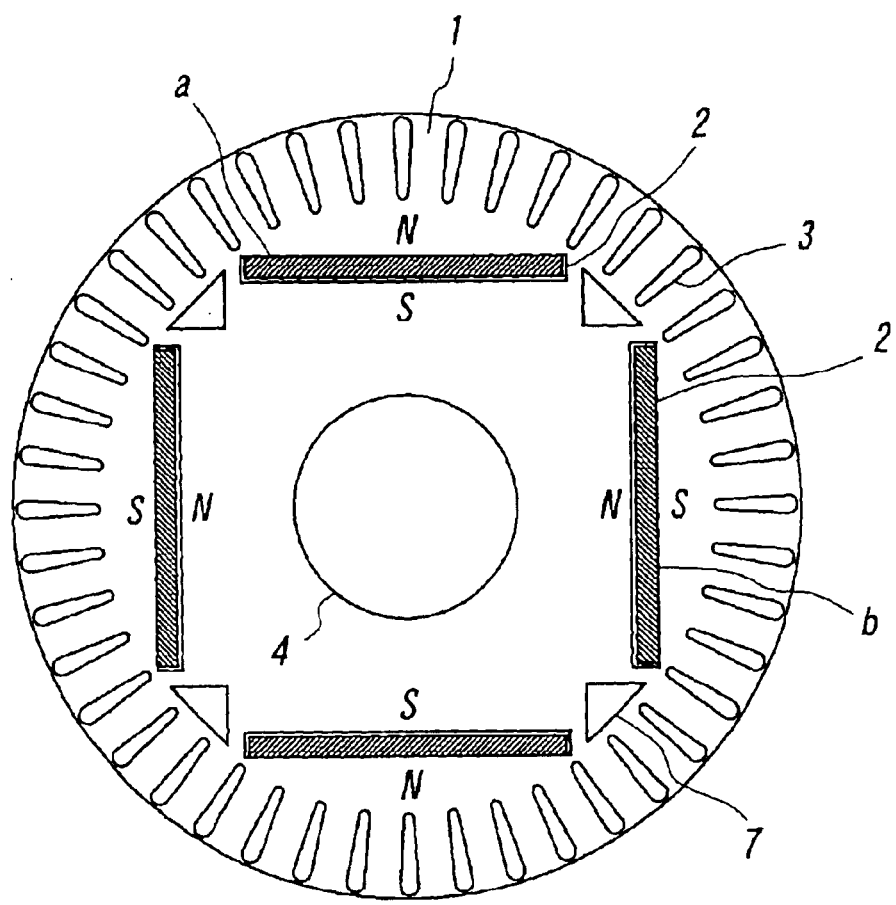
FIG. 2 is a cross-sectional view of a rotor of a four-pole induction starting synchronous motor of the prior art.

In an induction starting synchronous motor, for the purpose of producing torque as an induction machine, there are provided in a rotor core 1 induction coils 3 having both ends short-circuited located near a stator as shown in FIG. 2. As a result, the permanent magnets must be arranged between the induction coils 3 and a shaft hole 4, so that distances between the permanent magnets and the stator would become inevitably longer, resulting in increased leakage fluxes and decreased power factor and efficiency.

Figure 1:
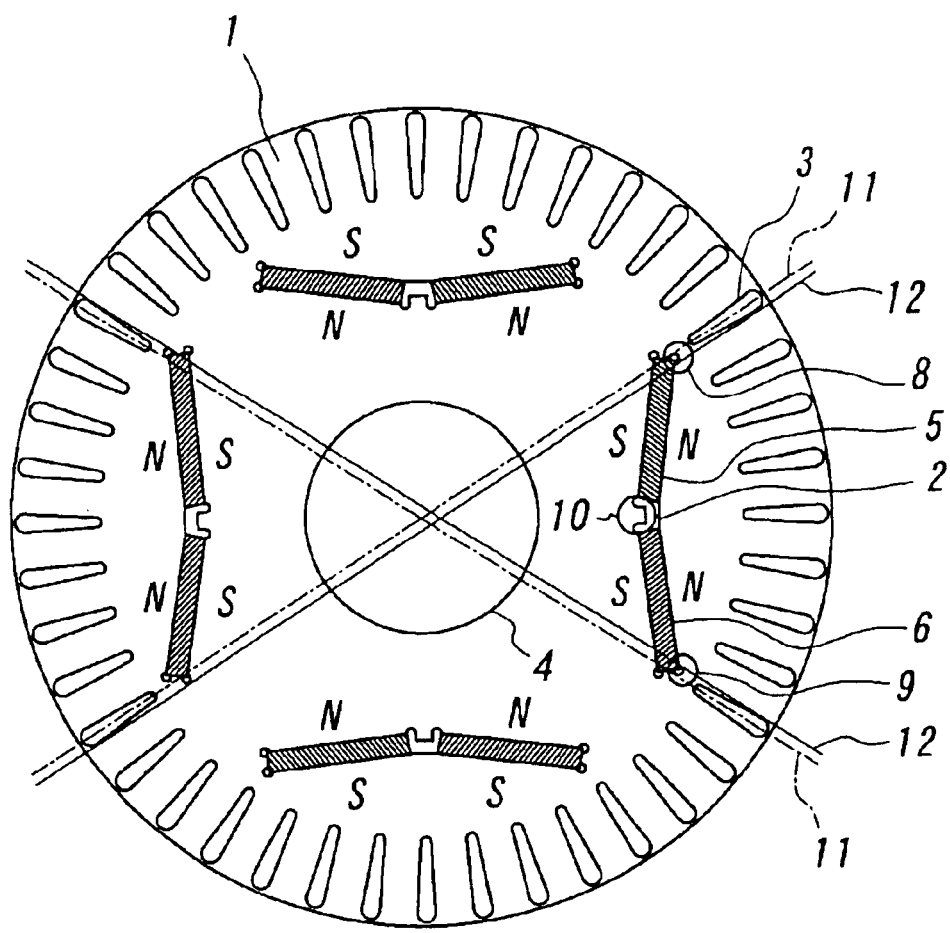
FIG. 1 is a cross-sectional view of a rotor of a four-pole induction starting synchronous motor according to one embodiment of the invention.

According to the invention, therefore, in order to reduce the leakage fluxes occurring at the corners 8 and 9 of the permanent magnets 5 and 6, as shown in FIG. 1 these corners 8 and 9 are arranged at locations where the induction coils 3 can have the same effect as that of clearances 7 without providing such clearances 7 in FIG. 2. In more detail, in FIG. 1 there are a number of radially inwardly tapered elongated shapes denoted by numeral 3 circumferentially arranged illustrating cross-sections of the induction coils 3. The corners 8 and 9 of the permanent magnets 5 and 6 are each arranged between a center line 11 of one tapered elongated shape and the diametrically opposed tapered elongated shape and a tangential line 12 to the two tapered elongated shapes, which is the one tangential line closer to the magnet poles of the magnet 5 or 6. Sometimes, the locations of the corners 8 and 9 of the permanent magnets 5 and 6 may be substantially in the proximity of the positions between the lines 11 and 12 slightly deviating from the locations exactly between these lines, inasmuch as the dimensions of permanent magnets and the induction coils, and the outer diameter of the rotor are obliged to be within ranges which are able to be manufactured. Moreover, distances between the induction coils 3 and the corners 8 and 9 of the permanent magnets 5 and 6 are determined to be the minimum within a range to ensure the required strength of the rotor.

According to the invention, the corners 8 and 9 of the permanent magnets 5 and 6 are used as criterion axes for determining angles of arrangement of the permanent magnets, thereby enabling distances between the magnets and the induction coils to be constantly minimal values to ensure sufficient strength against centrifugal forces, and achieving reduction in leakage fluxes in the proximity of the corners 8 and 9 of the permanent magnets 5 and 6 near the induction coils 3. As it is thus possible to minimize leakage fluxes due to magnetic coupling between the adjacent permanent magnets, the clearances 7 shown in FIG. 2 are no longer required.

In the rotor of the induction starting synchronous motor of the prior art, each of poles consists of a single permanent magnet or a plurality of permanent magnets arranged side by side in the longitudinal direction of the rotor to form a set of magnets. According to the invention, such a set of magnets is divided into two sets of magnets, thereby minimizing losses due to eddy-currents flowing on surfaces of the permanent magnets. According to the invention, however, the amount of the magnets used for one pole is comparable to, or less than the amount of magnets forming one pole by one set of magnets in the prior art.

Figure 3:
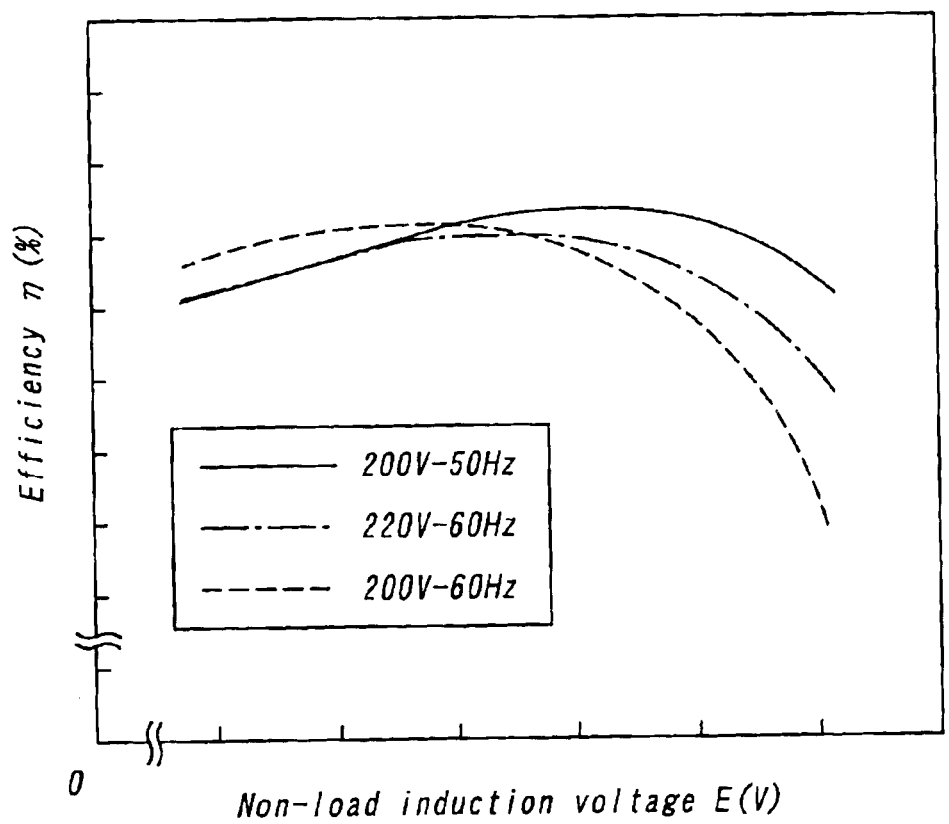
FIG. 3 is a graph showing a relation between unloaded induction voltage and efficiency.

According to the invention, the permanent magnets 5 and 6 are arranged inclined to a line connecting the corners 8 and 9 of the permanent magnets 5 and 6 by rotating these magnets through rotating angles about the corners 8 and 9 as rotating axes, which are nearest to the induction coils 3 among all the points on the magnets. The rotating angles are determined so as to obtain the maximum efficiency in the relation between the efficiency and unloaded induction voltage as shown in FIG. 3. Referring to FIG. 1 illustrating one embodiment of the invention, the magnets 5 and 6 are in positions where they have been rotated in directions so as to cause the magnetic poles to face toward each other. With the remaining poles, the magnets may be arranged at the rotating angles determined described above.

The rotating angles of the permanent magnets may be varied depending upon dimensions of the rotor, diameter of the shaft hole and size of the induction coils. The lengths of the magnets viewed in the plane of FIG. 1 can be varied by changing the rotating angles of the magnets. As longer magnets will cause the cost to go up, the rotating angles are determined to improve the efficiency without increasing the amount of the permanent magnets to be used.

The larger the rotating angle of the magnets, the greater is the distance between the permanent magnets 5 and 6 forming one pole of the induction starting synchronous motor. Consequently, the leakage fluxes are increased at the ends of the two sets of permanent magnets, and the same polarities will face toward each other so that portions where flux linkages of the stator and the permanent magnets are concentrated or not will clearly appear. Therefore, the distribution of magnetic flux densities in the gap between the stator and rotor becomes in a state including much high frequencies which would adversely affect the characteristics of the synchronous motor, with resulting lower efficiency. In order to attempt to overcome this problem, efficiencies are estimated from values obtained by calculation with the aid of magnetic field analysis of unloaded induction voltage with regard to rotating angles. FIG. 3 illustrates a relationship between the unloaded induction voltage and efficiency. From the relationship shown in FIG. 3, the rotating angle of the permanent magnets is determined.

As described above, the permanent magnets forming one pole are divided into two sets of magnets 5 and 6 so that leakage fluxes unavoidably occur at adjacent ends of two sets of the magnets. In order to prevent the leakage fluxes, instead of newly providing clearances, the two sets of permanent magnets are received in a slot 2 consisting of two parts forming an obtuse angle to provide a clearance between the permanent magnets 5 and 6, and a protrusion 10 is provided at the apex of the obtuse angle in the slot for preventing these magnets from contacting each other. The height of the protrusion may be less than half of thickness of the magnets in the radial direction of the rotor in consideration of the amount of the leakage fluxes. Portions of the slot on both sides of the protrusion at the apex are rounded to prevent the permanent magnets from being damaged at the portions in contact with walls of the slot.

As described above, forming the important feature of the invention is to determine the angles of arrangement of permanent magnets such that the efficiency becomes maximal in the relation between the unloaded induction voltage and efficiency. This feature according to the invention not only achieves the adjustment of the number of magnetic fluxes as the object of the invention but in addition simultaneously accomplishes the adjustment of reluctance. However, as the starting torque on being started depends upon design of squirrel-cage induction coils, size, material and arrangement of permanent magnets are determined on the basis of the shape of induction coils designed for a squirrel-cage induction motor.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A rotor of an induction starting synchronous motor, said rotor including permanent magnets and induction coils having both ends short-circuited in a core, wherein said permanent magnets are received in said core and one or more said permanent magnets are arranged side by side in a longitudinal direction of said core to form sets of permanent magnets, and two sets of said permanent magnets form respective poles of said induction starting synchronous motor, and wherein said two sets of permanent magnets forming each of said poles are located inclined in a cross-sectional plane of said core by rotating the two sets of permanent magnets about corners of said permanent magnets nearest said induction coils as rotating axes into directions such that magnetic fluxes induced by said two sets of permanent magnets are cancelled each other.

2. The rotor of the induction stating synchronous motor as set forth in claim 1 wherein said core is formed with slots each receiving therein said two sets of permanent magnets, each said slot being formed at its mid portion with a protrusion and a cavity so as not to permit the permanent magnets to contact each other.

* * * * *